US010054219B2

(12) United States Patent
Magrini et al.

(10) Patent No.: US 10,054,219 B2
(45) Date of Patent: Aug. 21, 2018

(54) JOYSTICK CONTROL FOR A CHANGE SPEED GEARBOX

(71) Applicant: CNH Industrial America LLC, New Holland, PA (US)

(72) Inventors: Sergio Magrini, Modena (IT); Gianpaolo Pasini, Modena (IT); Ivano Resca, San Giovanni in Persiceto (IT)

(73) Assignee: CNH Industrial America LLC, New Holland, PA (US)

( * ) Notice: Subject to any disclaimer, the term of this patent is extended or adjusted under 35 U.S.C. 154(b) by 337 days.

(21) Appl. No.: 14/776,818

(22) PCT Filed: Mar. 19, 2014

(86) PCT No.: PCT/EP2014/055469
§ 371 (c)(1),
(2) Date: Sep. 15, 2015

(87) PCT Pub. No.: WO2014/147105
PCT Pub. Date: Sep. 25, 2014

(65) Prior Publication Data
US 2016/0040778 A1 Feb. 11, 2016

(30) Foreign Application Priority Data

Mar. 20, 2013 (IT) .............................. MO2013A0072

(51) Int. Cl.
*F16H 63/36* (2006.01)
*F16H 59/04* (2006.01)
(Continued)

(52) U.S. Cl.
CPC ........... *F16H 59/042* (2013.01); *F16H 61/36* (2013.01); *F16H 63/38* (2013.01); *F16H 63/36* (2013.01);
(Continued)

(58) Field of Classification Search
CPC ........ F16H 59/042; F16H 63/38; F16H 61/36; F16H 2059/026
See application file for complete search history.

(56) References Cited

U.S. PATENT DOCUMENTS 4,328,712 A * 5/1982 Osborn .................. F16H 59/04
74/473.15
6,325,196 B1 * 12/2001 Beattie ................ F16H 59/0204
192/220.4
(Continued)

FOREIGN PATENT DOCUMENTS

DE 202008000715 4/2008
EP 1375974 1/2004
(Continued)

OTHER PUBLICATIONS

PCT International Search Report and Written Opinion dated Apr. 25, 2014.

Primary Examiner — David M Fenstermacher
(74) Attorney, Agent, or Firm — Rickard K. DeMille; Rebecca L. Henkel

(57) ABSTRACT

A joystick control is disclosed for a change speed gearbox having a support body, an axle rotatably supported by the body, an operating lever connected to the axle by a pivot pin having an axis perpendicular to that of the axle such that the operating lever is rotatable about the axis of the axle and is pivotable relative to the axle about the axis of the pivot pin, two actuating members rotatably supported by the axle and arranged one on each side of the operating lever, each actuating member being connectible to a respective Bowden cable to extend and retract the cable in response to rotation of the actuating member about the axle, and mating formations on the operating lever and the actuating members operative to engage the operating lever selectively for rotation with one or the other of the actuating members in
(Continued)

dependence upon the direction in which the operating lever is pivoted relative to the axle about the pivot pin. Resiliently biased detents are provided between the support body and the actuating members or the operating lever to resist rotation of the operating lever away from at least one defined stable position.

10 Claims, 4 Drawing Sheets

(51) Int. Cl.
 *F16H 61/36* (2006.01)
 *F16H 63/38* (2006.01)
 *F16H 59/02* (2006.01)
(52) U.S. Cl.
 CPC .............. *F16H 2059/026* (2013.01); *F16H 2059/0273* (2013.01)

(56) References Cited

U.S. PATENT DOCUMENTS

| | | | | |
|---|---|---|---|---|
| 6,443,024 B1* | 9/2002 | Skogward | | F16H 59/0204 74/473.18 |
| 7,174,802 B2* | 2/2007 | Wakayama | | F16H 59/0208 74/473.18 |
| 2001/0032524 A1* | 10/2001 | Jezewski | | F16H 59/0204 74/473.18 |
| 2001/0042418 A1* | 11/2001 | Junge | | F16H 59/0204 74/473.18 |
| 2004/0000210 A1* | 1/2004 | Cho | | F16H 59/0204 74/473.18 |
| 2004/0031346 A1* | 2/2004 | Kahara | | F16H 59/0204 74/473.18 |
| 2004/0168537 A1* | 9/2004 | Koontz | | F16H 59/0204 74/473.18 |
| 2005/0081671 A1* | 4/2005 | Oda | | F16H 59/0204 74/473.18 |
| 2005/0223835 A1* | 10/2005 | Wang | | F16H 59/105 74/473.18 |
| 2007/0137362 A1* | 6/2007 | Kortge | | F16H 61/24 74/473.18 |
| 2008/0098844 A1* | 5/2008 | Kato | | F16H 59/0204 74/473.18 |
| 2010/0107798 A1* | 5/2010 | Sickart | | F16H 59/10 74/473.18 |
| 2011/0132122 A1* | 6/2011 | Park | | F16H 59/0204 74/473.12 |

FOREIGN PATENT DOCUMENTS

| | | |
|---|---|---|
| EP | 1571374 | 9/2005 |
| WO | 2011157558 | 12/2011 |

\* cited by examiner

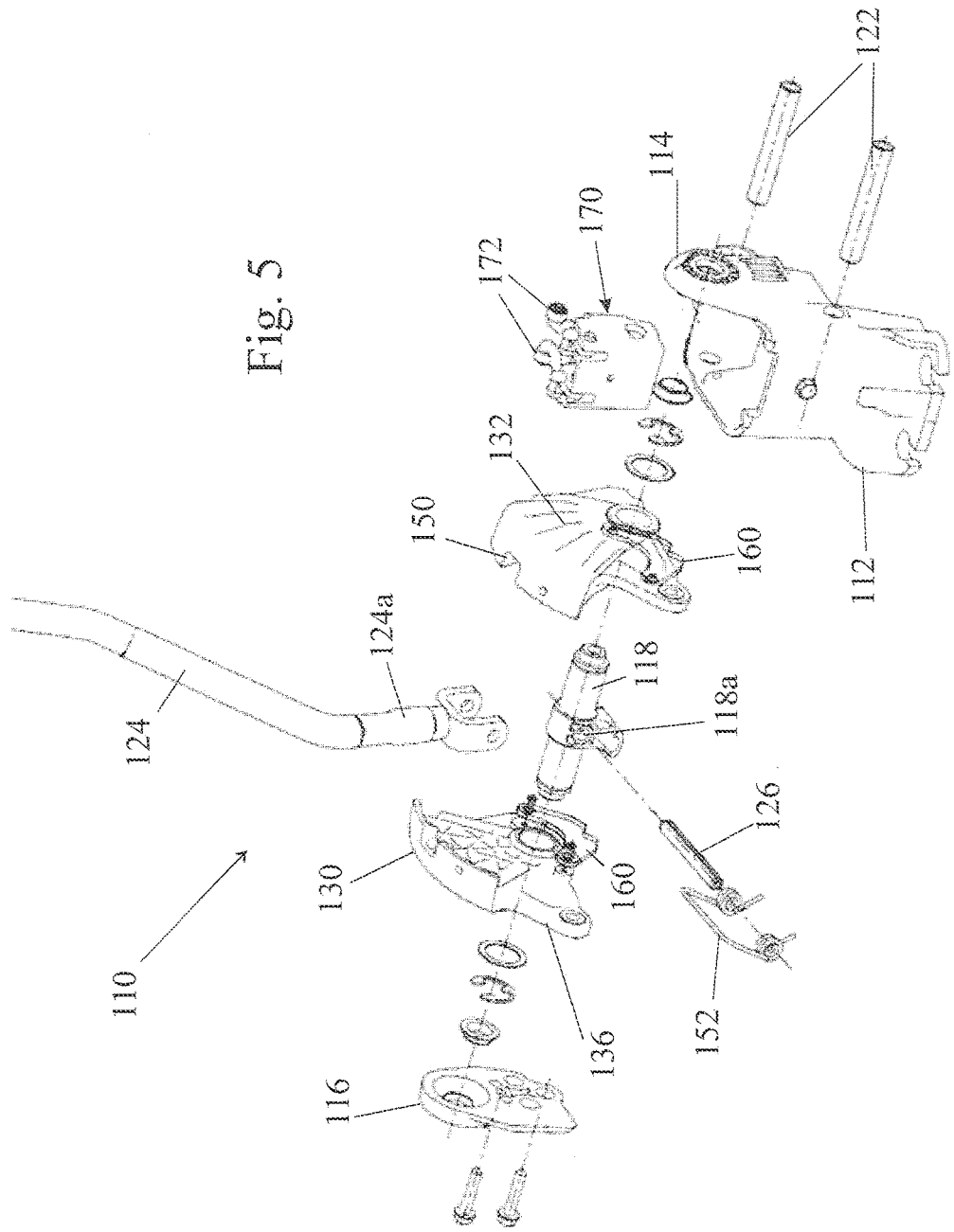

US 10,054,219 B2

JOYSTICK CONTROL FOR A CHANGE SPEED GEARBOX

CROSS REFERENCE TO RELATED APPLICATIONS

This application is a national stage of PCT Application No. PCT/EP2014/055469, entitled "A JOYSTICK CONTROL FOR A CHANGE SPEED GEARBOX", filed on Mar. 19, 2014, which claims priority from and the benefit of Italian Patent Application Serial No. MO2013A000072, filed on Mar. 20, 2013. Each of the foregoing applications is hereby incorporated by reference in its entirety.

FIELD OF THE INVENTION

The present invention relates to a joystick control for a change speed gearbox comprising a support body, an axle rotatably supported by the body, an operating lever connected to the axle by a pivot pin having an axis perpendicular to that of the axle such that the operating lever is rotatable about the axis of the axle and is pivotable relative to the axle about the axis of the pivot pin, two actuating members rotatably supported by the axle and arranged one on each side of the operating lever, each actuating member being connectible to a respective Bowden cable to extend and retract the cable in response to rotation of the actuating member about the axle, and mating formations on the operating lever and the actuating members operative to engage the operating lever selectively for rotation with one or the other of the actuating members in dependence upon the direction in which the operating lever is pivoted relative to the axle about the pivot pin.

BACKGROUND OF THE INVENTION

Such a joystick, which will herein be referred to as a joystick control of the type described initially, is disclosed in WO2011/157558, relevant parts of which are reproduced below and the whole of which is incorporated herein by reference.

OBJECT OF THE INVENTION

The present invention seeks to provide an improvement of joystick control of the type described initially to reduce free play in the operating lever.

SUMMARY OF THE INVENTION

According to the present invention, there is provided a joystick control of the type described initially, wherein resiliently biased detents are provided between the support body and the actuating members or the operating lever to resist rotation of the operating lever away from at least one defined stable position.

In some embodiments, the actuating members are formed or fitted with cams each having at least one depression, the cams being engaged by resiliently biased cam followers mounted on the support body.

The cam followers, in some embodiments, have rollers that roll on the surfaces of the cams as the actuating members are rotated.

In WO2011/157558, notches are provided in the sides of the actuating members for receiving a shaft of the operating lever and a spring may furthermore be provided to urge the operating lever to engage in the notch of one of the actuating members.

In order to avoid either of the actuating members experiencing a drag as the other is being moved to a different position, according to a preferred feature of the invention, an interlock device may be provided between the two actuating members to prevent movement of each actuating member relative to the support body when the other actuating member is not in a neutral position.

The interlock device may suitably comprise a locking pin slidably mounted in a through bore in a part of the support body disposed between the two actuating members, the opposite ends of the pin being receivable in holes in the actuating members, the holes and the pin being such that in the neutral positions of both actuating members the pin is biased towards a central position in which the ends of the pin engage partially within the holes of both actuating members but do not prevent rotation of either actuating member and when either member is rotated the pin is ejected from the bore in that member and engaged further in the hole of the other member to prevent rotation of the other member relative to the support body.

BRIEF DESCRIPTION OF THE DRAWINGS

The invention will now be described further, by way of example, with reference to the accompanying drawings, in which:

FIG. 5 is as exploded view of a joystick control of an embodiment of the invention.

DETAILED DESCRIPTION OF THE PREFERRED EMBODIMENT

FIGS. 1 to 4 show a joystick control of the type described initially. These figures are not of embodiments of the invention but will be described first to enable the later described embodiments of the invention to be understood more clearly.

Figure 4:
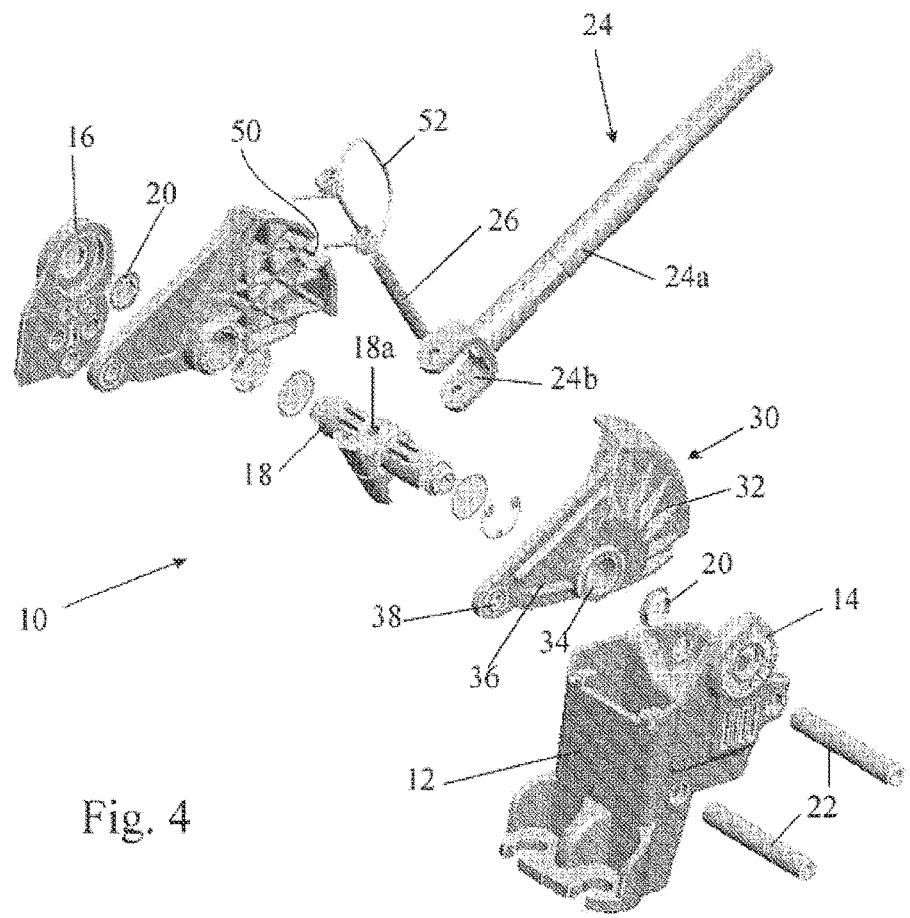
FIG. 4 is an exploded perspective view of the joystick control of FIG. 1 to FIG. 3.

The joystick control 10, as most clearly shown in FIG. 4, comprises a main support body 12 formed with pillar blocks 14 and 16 within which an axle 18 is journalled on bearing bushes 20. The support body 12 is formed in two symmetrical halves that are joined to one another by rolled steel pins 22. The pins 22 may be replaced by rivets, screws or bolts and serve only to hold the two halves of the support body 12 together.

An operating lever 24 is connected to the axle 18 by means of a pivot pin 26. The operating lever 24 has a shaft 24*a* that is moved in the same way as the gear stick of a conventional H-gate gearbox, with a fork 24*b* at one end that straddles the axle 18 and receives the pin 26 which passes through a hole 18*a* in the axle 18 extending at right angles to the rotational axis of the axle 18. In this way, the shaft 24*a* can be pivoted about the pin 26 relative to the axle 20 in the plane containing the axes of the axle 18 and the shaft 24*a* but rotates with the axle 18 in the orthogonal plane.

Two mirror symmetrical actuating members 30 are mounted on the axle 18 on opposite sides of the operating lever 24. Each actuating member 30 has a sector-shaped part 32 centred on a bearing 34 through which the axle 18 passes. Each actuating member 30 also has an extension arm 36 having a hole 38 at its end to receive a pin 40 by means of which the arm 36 is connected to the end of the inner cable 42 of a Bowden cable 44 of which the outer sheath is anchored to the support body 12 (see FIG. 1). Thus, rotation of each actuating member 30 clockwise as viewed in FIG. 4 (i.e. counter-clockwise as view in FIG. 1), will result in the inner cable 42 being extended, while rotation of an actuating member in the opposite direction will cause the connected inner cable 42 to be retracted into its sheath.

The radially outer surfaces of the actuating members 30 are formed with notches 50 that can receive the shaft 24*a* of the operating lever 24. Each notch is large enough to fully accommodate the shaft 24*a* so that when the shaft 24*a* rests within the notch of one actuating member, it lies totally outside the notch of the other actuating member.

At their opposite ends, the Bowden cable acts directly on two selectors of the gearbox. One of the Bowden cables moves a selector for engaging the first and second speeds and the other acts on a different selector used for engaging the third and fourth speeds.

Figure 1:
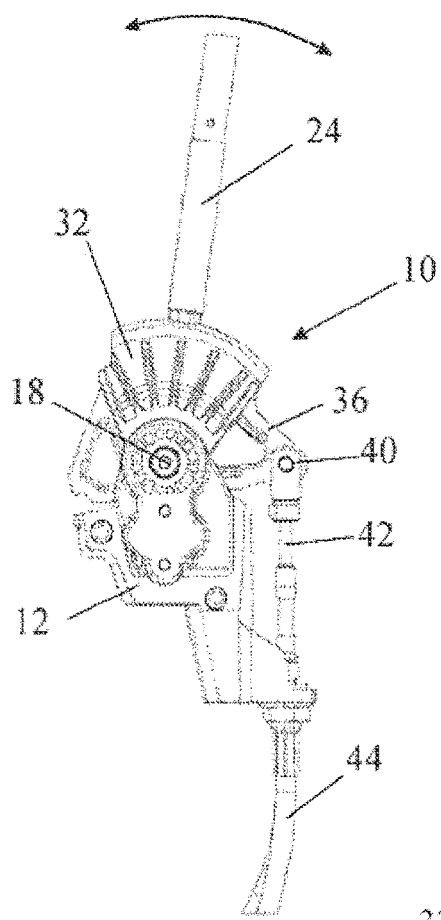
FIG. 1 is a side view of an assembled joystick control of the type described initially.
Figure 3:
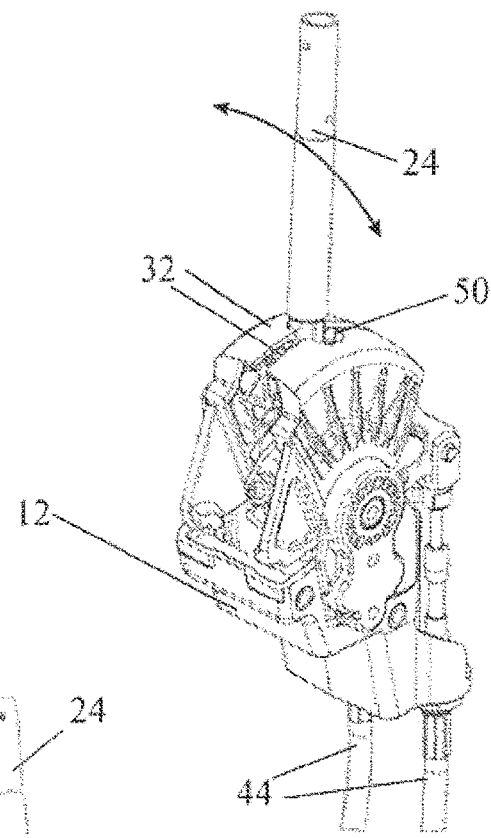
FIG. 3 is a perspective view of the joystick control of FIGS. 1 and 2.
Figure 2:
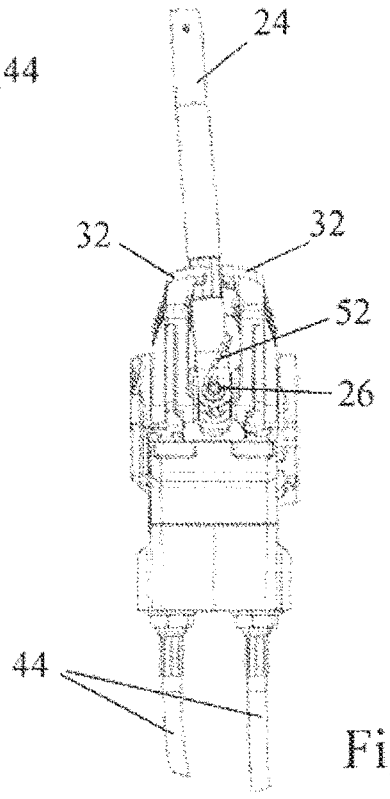
FIG. 2 is an end view of the joystick control of FIG. 1.

The joystick control is shown in FIGS. 1 to 3 with the operating lever 24 in the neutral position. Here, the two notches 50 of the two actuating members are in line with one another and the operating lever 24 can be pivoted about the pin 26 to rest wholly within either notch 50. A spring 52 is used to bias the operating lever to the left as viewed in FIG. 2, to engage within the notch of the actuating member 30 for selecting the first and second speeds.

If the operating lever 24 is moved from this rest position, clockwise as viewed in FIG. 1, this is equivalent to moving a gear stick up and will move the appropriate selector within the gearbox to select first speed. When the first speed is selected, the operating lever 24 cannot be moved from side to side because it is no longer aligned with the notch of the other actuating member 30. Hence, there is no sloppy movement of operating lever and the only direction in which the operating lever can move is counter-clockwise back towards the neutral position.

In the same way, of the operating lever is moved down (counter-clockwise in FIG. 1) the second speed will the engaged.

Only while the gearbox is in neutral is it possible to disengage the shaft 24*a* of the operating lever 24 from the notch 50 in one of the actuating member and engage it in the notch 50 of the other. Thus after returning to neutral, the operating lever 24 can be moved across to the engage in the notch of the actuating member 50 connected by the other Bowden cable to the second selector of the gearbox, to permit the third and fourth speeds to be selected by using the operating lever 24 to rotate the other actuating member 30 is the appropriate direction.

Most of the components of the joystick control may be made of a plastics material. In particular, the axle 18 may be formed of PPS (polyphenylene sulfide) polymer, the bearing bushes 20 of POM (polyoximethylene) omopolymer, and the operating lever 24 and the actuating members 30 of a glass fibre reinforced nylon such as PA66 35GF (polyamide with 35% glass fibre).

Figure 6:
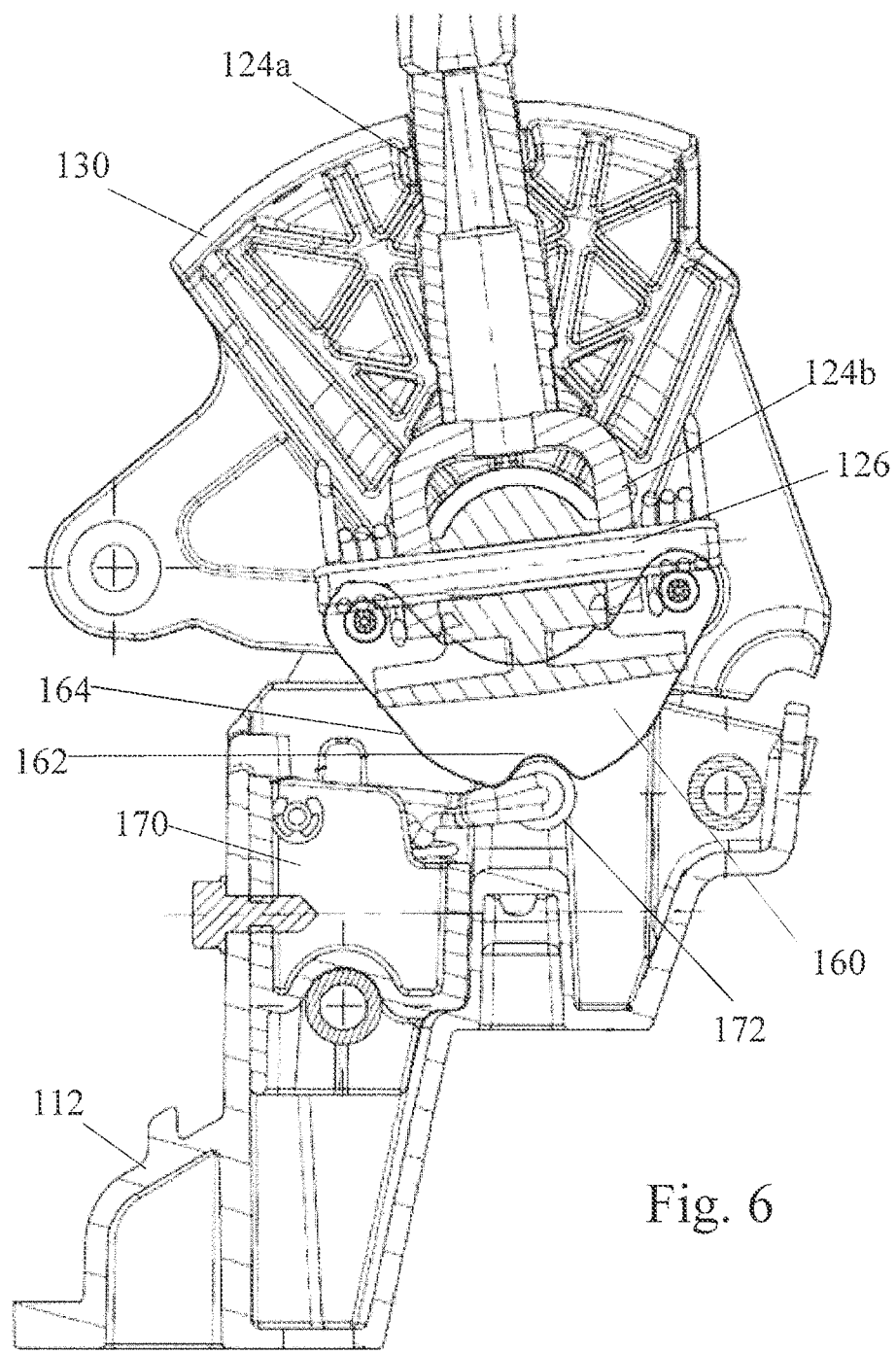
FIG. 6 is a section through the joystick control of FIG. 5 through a plane passing through the shaft of the operating lever.

Referring now to FIGS. 5 to 7, to avoid unnecessary repetition, equivalent parts to those already described have been allocated similar reference numerals in the 100 series (i.e. each numeral has been augmented by 100) and will not be described again.

Two cams 160 are secured to the lower edge as viewed of each of the actuating members 130. As an alternative, the cams 160 can be formed as part of the actuating members 130. A cam follower module 170 with two roller followers 172 is mounted within the support body 112 and held in place by one of the roller steel pins 122.

The interaction between the roller followers 172 and the cams 160 is best shown in the section of FIG. 6. Each cam has a central depression 162 that is aligned with the respective spring biased follower roller 172 when the actuating member 130 is in its neutral position. The roller follower 172 acts as a ball catch, or a spring biased detent, to resist rotation of the actuating lever away from the neutral position. The outer flanks 164 of the cams 160, on the other hand push the operating lever towards one or other of its end positions, once enough force has been applied to the operating lever to move it out of its neutral position against the action of the roller follower 172.

The cams 160 in this way provide positive location of the operating lever 124 in the neutral position and in its end positions, significantly improving the feel of the joystick control 110 and rendering it more positive.

A further improvement of the joystick of the type described initially is achieved by providing an interlock that prevents an actuating member 130 from moving when out of its neutral position when the other actuating member 130 has been moved out of its neutral position.

Figures 7A, 7B, 7C:
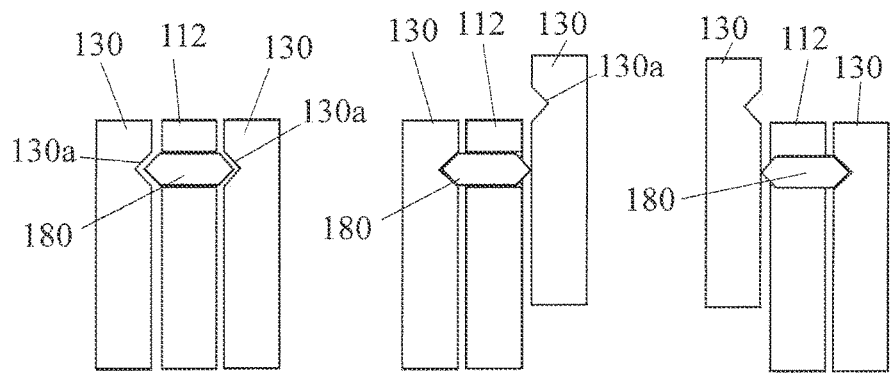
FIGS. 7*a*, 7*b* and 7*c* show sections through an interlock device for preventing an actuating member from moving when the other actuating member is not in its neutral position, the figures showing the interlock device in three different positions of the actuating members.

A suitable such interlock is shown in FIGS. 7*a* to 7*c*. A pin 180 with tapered or rounded ends is mounted in a through bore in a part of the support body 112 lying between the two actuating members 130. In the neutral position of both actuating members 130, shown in FIG. 7*a*, the pin 180 may be held by an optional spring (not shown) in a central position with its ends partially extending into blind holes 130*a* in the actuating members 130. Because of the shaping of the ends of the pin 180, as either of the actuating members 130 is moved out of its neutral position, as shown in FIGS. 7*b* and 7*c*, it acts to displace the pin 180 into engagement in the hole 130*a* of the other actuating member 130, thereby locking the other actuating member 130 relative to the support body 112.

While the embodiment of the invention described in FIG. 5 has cams mounted on both of the actuating members 130, it would be alternatively possible to mount a single cam on the operating lever 124 to achieve the same effect.

The invention claimed is:

1. A joystick control for a change speed gearbox, comprising:
   a support body;
   an axle rotatably supported by the support body;
   an operating lever connected to the axle by a pivot pin having an axis perpendicular to an axis of the axle such that the operating lever is rotatable about the axis of the axle and is pivotable relative to the axle about the axis of the pivot pin;
   two actuating members rotatably supported by the axle and arranged one on each side of the operating lever, each actuating member being connectible to a respective Bowden cable to extend and retract the cable in response to rotation of the actuating member about the axle; and mating formations on the operating lever and the two actuating members operative to engage the operating lever selectively for rotation with one or the other of the two actuating members in dependence upon a direction in which the operating lever is pivoted relative to the axle about the pivot pin;

wherein resiliently biased detents are provided between the support body and the two actuating members or the operating lever to resist rotation of the operating lever away from at least one stable position, and wherein the mating formations comprise notches in the sides of the two actuating members, and the notches are configured to receive the operating lever.

2. A joystick control for a change speed gearbox, comprising:

a support body;

an axle rotatably supported by the support body;

an operating lever connected to the axle by a pivot pin having an axis perpendicular to an axis of the axle such that the operating lever is rotatable about the axis of the axle and is pivotable relative to the axle about the axis of the pivot pin;

two actuating members rotatably supported by the axle and arranged one on each side of the operating lever, each actuating member being connectible to a respective Bowden cable to extend and retract the cable in response to rotation of the actuating member about the axle; and mating formations on the operating lever and the two actuating members operative to engage the operating lever selectively for rotation with one or the other of the two actuating members in dependence upon a direction in which the operating lever is pivoted relative to the axle about the pivot pin;

wherein resiliently biased detents are provided between the support body and the two actuating members or the operating lever to resist rotation of the operating lever away from at least one stable position, wherein the two actuating members are formed or fitted with cams each having at least one depression, the cams being engaged by resiliently biased cam followers mounted on the support body, and wherein the cam followers have rollers that roll on the surfaces of the cams as the two actuating members are rotated.

3. A joystick control for a change speed gearbox, comprising:

a support body;

an axle rotatably supported by the support body;

an operating lever connected to the axle by a pivot pin having an axis perpendicular to an axis of the axle such that the operating lever is rotatable about the axis of the axle and is pivotable relative to the axle about the axis of the pivot pin;

two actuating members rotatably supported by the axle and arranged one on each side of the operating lever, each actuating member being connectible to a respective Bowden cable to extend and retract the cable in response to rotation of the actuating member about the axle; and mating formations on the operating lever and the two actuating members operative to engage the operating lever selectively for rotation with one or the other of the two actuating members in dependence upon a direction in which the operating lever is pivoted relative to the axle about the pivot pin;

wherein resiliently biased detents are provided between the support body and the two actuating members or the operating lever to resist rotation of the operating lever away from at least one stable position, and wherein an interlock device is provided between the two actuating members to block movement of one actuating member relative to the support body when the other actuating member is not in an actuating member position corresponding to the at least one stable position of the operating lever.

4. The joystick control of claim 3, wherein the interlock device comprises a locking pin slidably mounted in a through bore in a part of the support body disposed between the two actuating members, opposite ends of the locking pin being receivable in holes in the two actuating members, the holes and the locking pin being such that in neutral positions of both actuating members the locking pin is biased toward a central position in which the opposite ends of the locking pin engage partially within the holes of both actuating members but do not block rotation of either actuating member and when either member is rotated the locking pin is ejected from a respective hole in that member and engaged further in the respective hole of the other member to block rotation of the other member relative to the support body.

5. A joystick control for a change speed gearbox, comprising:

a support body;

an axle rotatably supported by the support body;

an operating lever connected to the axle by a pivot pin having an axis perpendicular to an axis of the axle such that the operating lever is rotatable about the axis of the axle and is pivotable relative to the axle about the axis of the pivot pin;

two actuating members rotatably supported by the axle and arranged one on each side of the operating lever, each actuating member being connectible to a respective Bowden cable to extend and retract the cable in response to rotation of the actuating member about the axle; and mating formations on the operating lever and the two actuating members operative to engage the operating lever selectively for rotation with one or the other of the two actuating members in dependence upon a direction in which the operating lever is pivoted relative to the axle about the pivot pin;

wherein resiliently biased detents are provided between the support body and the two actuating members or the operating lever to resist rotation of the operating lever away from at least one stable position, wherein each of the two actuating members is rotatable by the operating lever between a neutral position, an "up" position in which the respective Bowden cable is extended, and a "down" position in which the respective Bowden cable is retracted, and wherein the mating formations on the operating lever and the two actuating members are such that the operating lever may only be disengaged from one of the two actuating members and engaged with the other actuating member when both the actuating members are in their respective neutral positions.

6. The joystick control of claim 5, wherein the mating formations comprise notches in the sides of the two actuating members, and the notches are configured to receive the operating lever.

7. The joystick control of claim 1, wherein a spring is provided to urge the operating lever to engage in a respective notch of one of the two actuating members.

8. The joystick control of claim 1, wherein the support body, the axle, the operating lever, and the two actuating members are formed of plastics materials.

9. The joystick control of claim 8, wherein a respective plastics material of at least one of the operating lever, the two actuating members, and the support body comprises glass fibre reinforced nylon.

10. A gearbox connected by two Bowden cables to the joystick control of claim 1, wherein a first Bowden cable of the two Bowden cables is connected to one of the two actuating members, a second Bowden cable of the two Bowden cables is connected to another of the two actuating members, the gearbox has two gear ratio selectors, a first gear ratio selector of the two gear ratio selectors being movable by the first Bowden cable from a neutral position in one direction to select a first gear ratio and from the neutral position in an opposite direction to select a second gear ratio, and a second gear ratio selector of the two gear ratio selectors being movable by the second Bowden cable from a neutral position in one direction to select a third gear ratio and from the neutral position in an opposite direction to select a fourth gear ratio, pivoting of the operating lever about the pivot pin relative to the axle having no effect on the two Bowden cables nor on the positions of the gear ratio selectors.

* * * * *